United States Patent
Hsieh et al.

(10) Patent No.: US 8,960,560 B2
(45) Date of Patent: Feb. 24, 2015

(54) ELECTRONIC TAG CAPABLE OF COUPLING TO METAL

(71) Applicant: FAVITE Inc., Jhubei, Hsinchu County (TW)

(72) Inventors: Hung-Tuan Hsieh, Jhubei (TW);
Ching-Hsin Chang, Jhubei (TW);
Kun-Jen Huang, Jhubei (TW)

(73) Assignee: Favite Inc., Jhubei, Hsinchu County (TW)

( * ) Notice: Subject to any disclaimer, the term of this patent is extended or adjusted under 35 U.S.C. 154(b) by 70 days.

(21) Appl. No.: 13/758,277

(22) Filed: Feb. 4, 2013

(65) Prior Publication Data
US 2013/0200161 A1 Aug. 8, 2013

(30) Foreign Application Priority Data
Feb. 8, 2012 (TW) .............................. 101104130 A

(51) Int. Cl.
| | |
|---|---|
| *G06K 19/00* | (2006.01) |
| *G06K 19/04* | (2006.01) |
| *G06K 19/06* | (2006.01) |
| *G06K 19/077* | (2006.01) |
| *H01Q 9/42* | (2006.01) |
| *H01Q 1/22* | (2006.01) |

(52) U.S. Cl.
CPC ............ *G06K 19/07771* (2013.01); *H01Q 9/42* (2013.01); *H01Q 1/2225* (2013.01)
USPC ............................ 235/492; 235/487; 340/10.1

(58) Field of Classification Search
CPC .................. G06K 19/07749; G06K 19/07771; G06K 19/00; G06K 19/04; G06K 19/06; H01Q 9/0407; H01Q 1/2208; H01Q 1/48
USPC ................................... 235/487, 492; 340/10.7
See application file for complete search history.

(56) References Cited

U.S. PATENT DOCUMENTS

| | | | | |
|---|---|---|---|---|
| 6,278,369 | B2 * | 8/2001 | Smith et al. ................ | 340/572.7 |
| 8,169,322 | B1 * | 5/2012 | Zhan et al. ................. | 340/572.7 |
| 8,172,149 | B2 * | 5/2012 | Yamagajo et al. ........... | 235/492 |
| 8,381,998 | B1 * | 2/2013 | Chang .......................... | 235/492 |
| 8,410,938 | B2 * | 4/2013 | Sakama ...................... | 340/572.7 |
| 8,487,831 | B2 * | 7/2013 | Yoshida et al. .............. | 343/904 |
| 2002/0175873 | A1 * | 11/2002 | King et al. .................... | 343/767 |
| 2006/0181419 | A1 * | 8/2006 | Chen et al. ................. | 340/572.1 |
| 2006/0208901 | A1 * | 9/2006 | Kai et al. .................... | 340/572.7 |
| 2008/0111760 | A1 * | 5/2008 | Sakama et al. ............... | 343/860 |
| 2009/0213012 | A1 * | 8/2009 | Jiang et al. ............ | 343/700 MS |
| 2010/0253583 | A1 * | 10/2010 | Furutani ....................... | 343/702 |

(Continued)

*Primary Examiner* — Thien M Le
*Assistant Examiner* — Claude J Brown
(74) *Attorney, Agent, or Firm* — Muncy, Geissler, Olds & Lowe, P.C.

(57) ABSTRACT

An electronic tag capable of coupling to metal can be attached to the metallic surface of a product, and includes a substrate, a radiation body arranged on a surface of the substrate, a grounding body and a reference line. The grounding body is also arranged on the aforementioned surface and electrically connects to the radiation body. The reference line is arranged on the aforementioned surface and in the grounding body. While such electronic tag is attached to the metallic surface of a product, a portion of the grounding body, which is opposite to the radiation body, contacts with such metallic surface, so that the signal reading distance of such electronic tag can be broadened and extended in virtue of coupling such grounding body with such metallic surface to cause the grounding area to be enlarged. The extent of such contact shall not extend beyond such reference line.

9 Claims, 4 Drawing Sheets

(56) References Cited

U.S. PATENT DOCUMENTS

| | | | |
|---|---|---|---|
| 2011/0057845 A1* | 3/2011 | Rotter | 343/700 MS |
| 2011/0102150 A1* | 5/2011 | Sotobayashi et al. | 340/10.1 |
| 2011/0284643 A1* | 11/2011 | Yamagajo et al. | 235/492 |
| 2012/0038536 A1* | 2/2012 | Soler Castany et al. | 343/848 |
| 2012/0074230 A1* | 3/2012 | Bernhard et al. | 235/492 |
| 2012/0126016 A1* | 5/2012 | Yang et al. | 235/492 |
| 2014/0028530 A1* | 1/2014 | Flores-Cuadras | 343/904 |
| 2014/0131455 A1* | 5/2014 | Takigahira | 235/492 |

\* cited by examiner

ELECTRONIC TAG CAPABLE OF COUPLING TO METAL

This application is based on and claims priority from Taiwan Application No. 101104130, filed Feb. 8, 2012, the disclosure of which is hereby incorporated by reference herein in its entirety.

BACKGROUND OF THE INVENTION

1. Field of the Invention

The present invention relates to an antenna and more in particular, to an antenna for an electronic tag.

2. Related Art of the Invention

An electronic tag is widely applied in a variety of products or working pieces. After a signal emitted from a reading device is received by the antenna of the electronic tag or the reading device is close to the electronic tag, the signal is transmitted back to the reading device. Accordingly, the reading device can read the information of the electronic tag which is attached to the product or detect the position of the working piece.

FIG. 1 schematically shows a state in use of a conventional electronic tag. As shown in FIG. 1, a conventional electronic tag 100 has an antenna having a first polygonal metallic frame 101; a second polygonal metallic frame 102 surrounds and electrically connects to the first polygonal, metallic frame 101. Two radiation bodies 103 are respectively electrically connected to either side of the second polygonal metallic frame 102, and the radiation bodies 103 are laid out in the serpentine shape. A chip 104 is electrically connected to the first polygonal metallic frame 101 and the second polygonal metallic frame 102.

When the electronic tag 100 is used to be attached to a product 200, the electronic tag 100 has to keep a suitable distance away from a metallic surface 201 of the product 200 because the metallic surface 201 may affect the property of the antenna if the chip 104 of the electronic tag 100 is close to the metallic surface 201 too much. Specifically, in the event that the electronic tag 100 is close to the metallic surface 201 too much, the information of the electronic tag 100 cannot be read by the reading device within the designed reading scope since the signal reading distance of such electronic tag 100 is reduced thereby.

SUMMARY OF THE INVENTION

One primary object and purpose of the invention is to provide an electronic tag with a part of the antenna of such electronic tag which is attached to a metallic surface of a product to solve the aforementioned drawback of the conventional electronic tag. The signal reading distance of the electronic tag can be broadened and extended in virtue of coupling the part of such antenna with the metallic surface of the product to cause the grounding area to be enlarged, and the size of the electronic tag can also be reduced thereby.

In order to fulfill the object and purpose described above, the invention provides an electronic tag capable of coupling to metal. The electronic tag for being attached to a metallic surface of a product comprises: a substrate; a radiation body arranged on a surface of the substrate; a grounding body arranged on the surface of the substrate which has such radiation body thereon and electrically connects to the radiation body; and a reference line arranged on the surface of the substrate which has such grounding body thereon, the reference line further arranged in the grounding body. While the electronic tag is attached to the metallic surface of a product, a portion of the grounding body, which is opposite to the radiation body, shall contact with the metallic surface, so that the signal reading distance of such electronic tag can be broadened and extended in virtue of coupling the grounding body with the metallic surface to cause the grounding area to be enlarged; provided that the extent of such contact shall not extend beyond such reference line.

The substrate may be but not be limited to a transparent or opaque sheet of polyimide (PI), polyvinyl chloride (PVC), polyethylene terephthalate (PET) or a composite of PI, PVC or PET sheet and a sticker.

The radiation body is arranged on a surface of the substrate. The radiation body has a first metallic line segment, a second metallic line segment connects to the first metallic line segment in a certain angle, a third metallic line segment connects to the second metallic line segment and a fourth metallic line segment connects to the third metallic line segment in a certain angle, wherein the third metallic line segment is parallel with the first metallic line segment.

The first metallic line segment, the second metallic line segment and the third metallic line segment are formed into a U shape.

The grounding body is arranged on the surface of the substrate. The grounding body has a fifth metallic line segment which electrically connects to the fourth metallic line segment, a sixth metallic line segment connects to the fifth metallic line segment in a certain angle, a seventh metallic line segment connects to the sixth metallic line segment in a certain angle, an eighth metallic line segment connects to the seventh metallic line segment in a certain angle and a ninth metallic line segment connects to the juncture of the fifth metallic line segment and the fourth metallic line segment, wherein the seventh metallic line segment is opposite to the fifth metallic line segment, the eighth metallic line segment is opposite to the sixth metallic line segment, and the ninth metallic line segment is opposite to the sixth metallic line segment, and there is a gap between the eighth metallic line segment and the ninth metallic line segment. Two metallic points are arranged on the surface of the substrate and on the point that sits outside the grounding body and beside such gap.

A chip is arranged on the gap between the eighth metallic line segment and the ninth metallic line segment, and electrically connected to the eighth metallic line segment, the ninth metallic line segment and the two metallic points.

The fifth metallic line segment, the sixth metallic line segment, the seventh metallic line segment, the eighth metallic line segment and the ninth metallic line segment are formed into a window frame shape. The reference line is arranged on the surface of the substrate and in such frame formed by the fifth metallic line segment, the sixth metallic line segment, the seventh metallic line segment, the eighth metallic line segment and the ninth metallic line segment of the grounding body.

DETAILED DESCRIPTION OF THE INVENTION

The present invention will be apparent from the following detailed description, which proceeds with reference to the accompanying drawings. The accompanying drawings are not meant to be construed in a limiting sense, which are only for reference and explanation.

Figure 1:
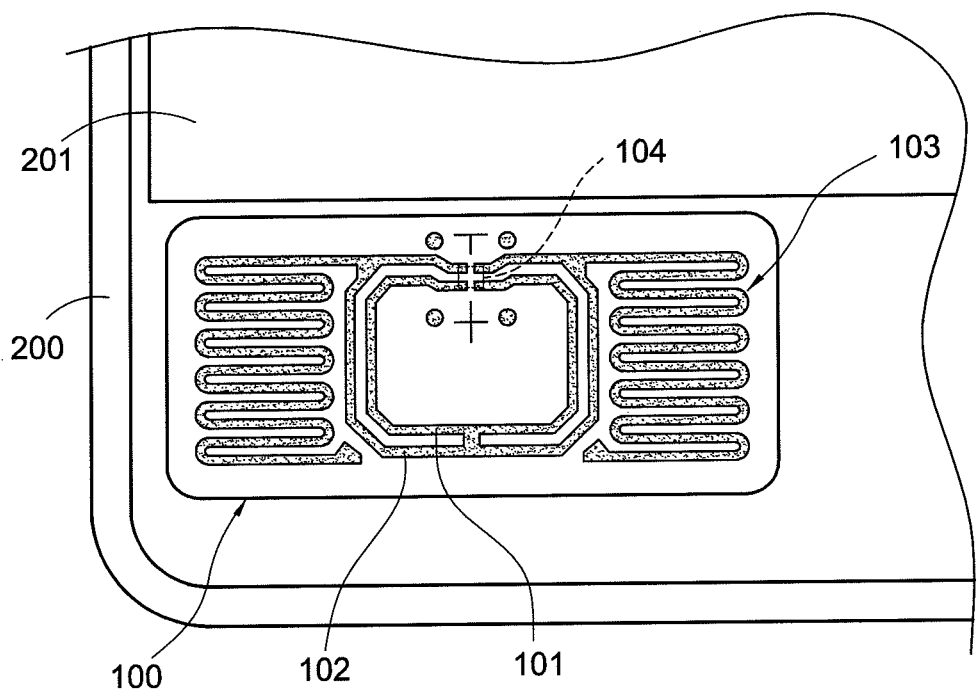
FIG. 1 schematically shows a state in use of a conventional electronic tag.
Figure 2:
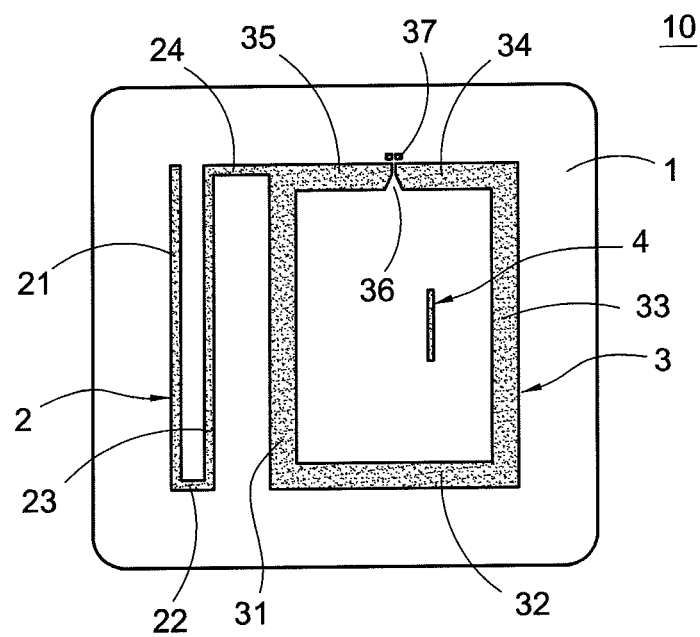
FIG. 2 schematically shows an electronic tag of an embodiment of the invention.

Please refer to FIG. 2. FIG. 2 schematically shows an electronic tag of an embodiment of the invention. As shown in FIG. 2, the invention provides an electronic tag 10 which includes a substrate 1, a radiation body 2, a grounding body 3, a reference line 4 and two metallic points 37.

The substrate 1 may be but not be limited to a transparent or opaque sheet of polyimide (PI), polyvinyl chloride (PVC), polyethylene terephthalate (PET) or a composite of PI, PVC or PET sheet and a sticker.

The radiation body 2 is arranged on a surface of the substrate 1. The radiation body 2 has a first metallic line segment 21, a second metallic line segment 22 connects to the first metallic line segment 21 in a certain angle, a third metallic line segment 23 connects to the second metallic line segment 22 and a fourth metallic line segment 24 connects to the third metallic line segment 23 in a certain angle, wherein the third metallic line segment 23 is parallel with the first metallic line segment 21. In the embodiment, the first metallic line segment 21, the second metallic line segment 22 and the third metallic line segment 23 are formed into a U shape.

The grounding body 3 is arranged on the surface of the substrate 1. The grounding body 3 has a fifth metallic line segment 31 which electrically connects to the fourth metallic line segment 24, a sixth metallic line segment 32 connects to the fifth metallic line segment 31 in a certain angle, a seventh metallic line segment 33 connects to the sixth metallic line segment 32 in a certain angle, an eighth metallic line segment 34 connects to the seventh metallic line segment 33 in a certain angle and a ninth metallic line segment 35 connects to the juncture of the fifth metallic line segment 31 and the fourth metallic line segment 24, wherein the seventh metallic line segment 33 is opposite to the fifth metallic line segment 31, the eighth metallic line segment 34 is opposite to the sixth metallic line segment 32, and the ninth metallic line segment 35 is opposite to the sixth metallic line segment 32, and there is a gap between the eighth metallic line segment 34 and the ninth metallic line segment 35. In the embodiment, the fifth metallic line segment 31, the sixth metallic line segment 32, the seventh metallic line segment 33, the eighth metallic line segment 34 and the ninth metallic line segment 35 are formed into a window frame shape.

The reference line 4 is arranged on the surface of the substrate 1 and in such frame formed by the fifth metallic line segment 31, the sixth metallic line segment 32, the seventh metallic line segment 33, the eighth metallic line segment 34 and the ninth metallic line segment 35 of the grounding body 3. Two metallic points 37 are arranged on the surface of the substrate 1 and on the point that sits outside the grounding body 3 and beside such gap 36.

Figure 3:
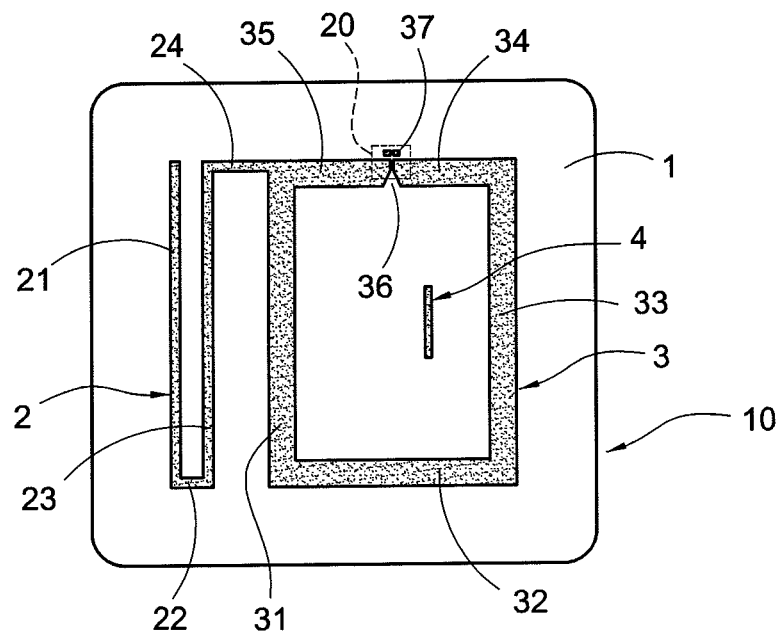
FIG. 3 schematically shows a state in use of the electronic tag of an embodiment of the invention.

Please refer to FIG. 3. FIG. 3 schematically shows a state in use of the electronic tag of an embodiment of the invention. As shown in FIG. 3, a chip 20 is arranged on the gap 36 so that the chip 20 may electrically connect to the eighth metallic line segment 34, the ninth metallic line segment 35 and the two metallic points 37 while the electronic tag of the embodiment of the invention is in use.

After a signal emitted from a reading device (not shown in drawings) is received by the radiation body 2 of the electronic tag 10, the signal is transmitted to the chip 20. A signal is outputted from the chip 20 after handling, and then emitted from the radiation body 2 to the reading device. Accordingly, the reading device can receive the information of the electronic tag 10.

Figure 4:
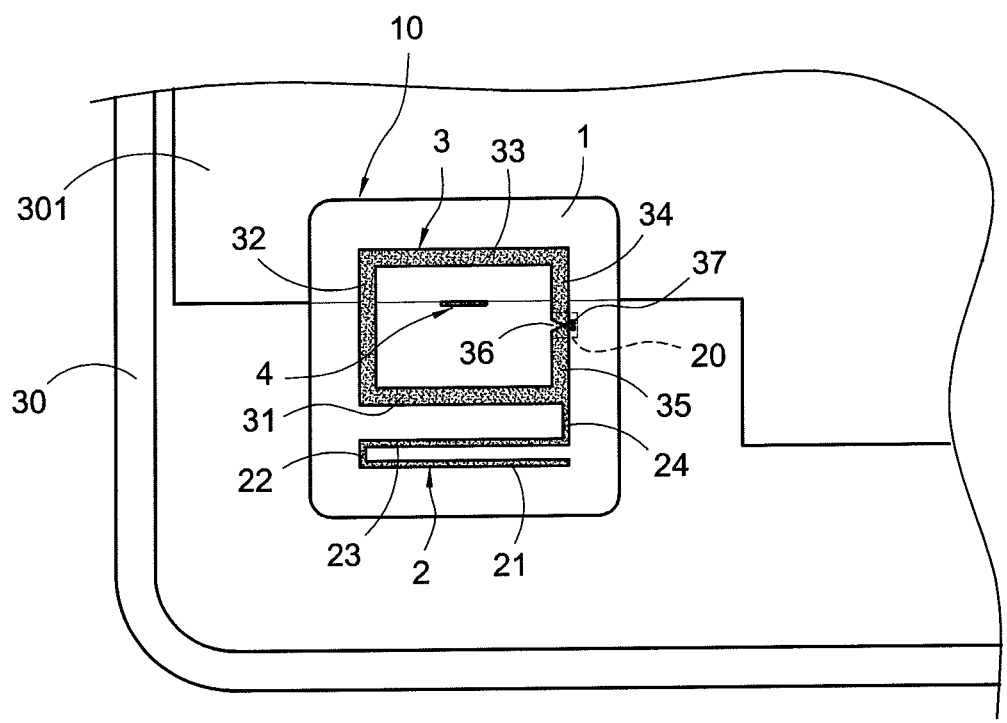
FIG. 4 schematically shows another state of in use of the electronic tag of an embodiment of the invention.

Please refer to FIG. 4. FIG. 4 schematically shows another state of in use of the electronic tag of an embodiment of the invention. As shown in FIG. 4, the electronic tag 10 of the invention is attached to the metallic surface (or metallic casing) 301 of a product 30 after the chip 20 has been electrically connected to the electronic tag 10; meanwhile, in view of the reference line 4, the sixth metallic line segment 32, the seventh metallic line segment 33 and the eighth metallic line segment 34 of the grounding body 3, which are opposite to the radiation body 2, contact with the metallic surface 301, provided that the extent of such contact shall not extend beyond such reference line so that the chip 20 may keep a suitable distance away from the metallic surface 301. Accordingly, the signal reading distance of the electronic tag 10 can be broadened and extended in virtue of coupling the sixth metallic line segment 32, the seventh metallic line segment 33 and the eighth metallic line segment 34 with such metallic surface 301 to cause the grounding area to be enlarged; moreover, the size of the electronic tag 10 can also be reduced thereby.

Figure 5:
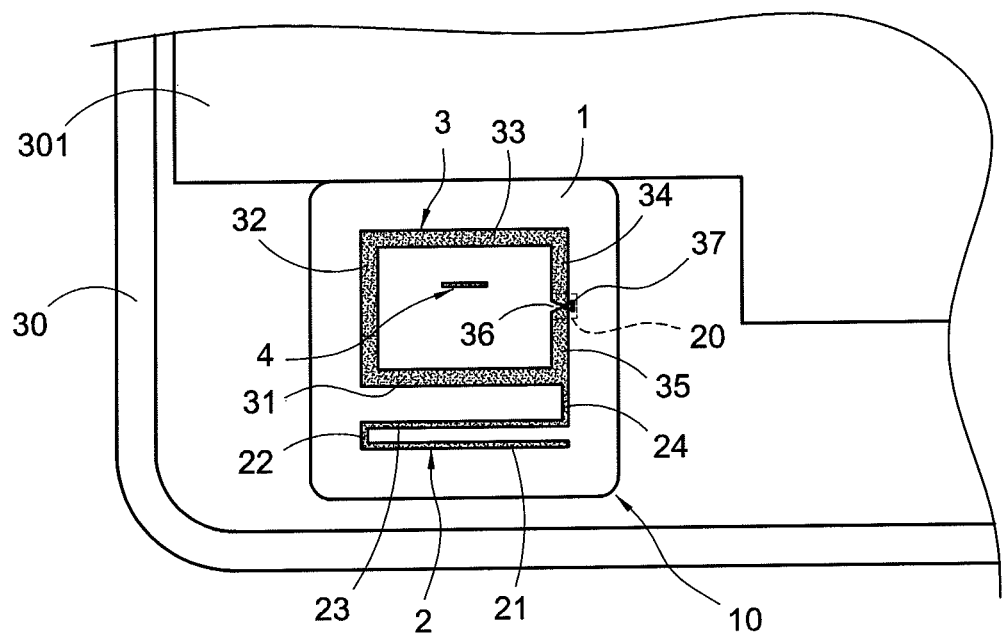
FIG. 5 schematically shows an electronic tag which is attached to an area that is not located on the metallic surface of the product according to the invention.
Figure 6:
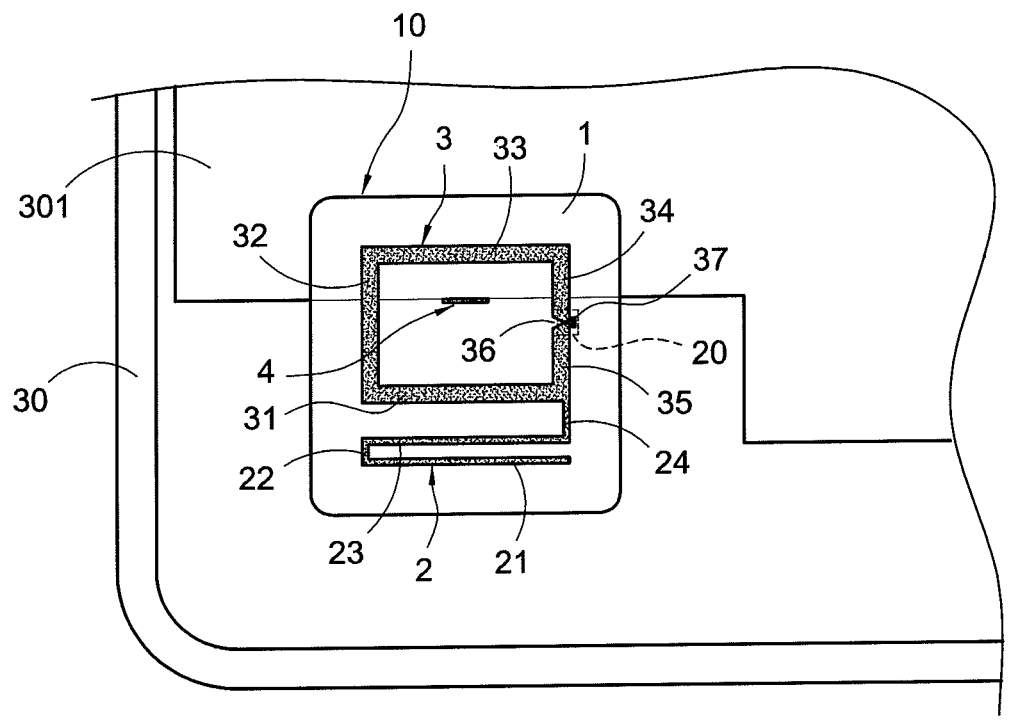
FIG. 6 schematically shows an electronic tag which is attached to the metallic surface of the product according to the invention.
Figure 7:
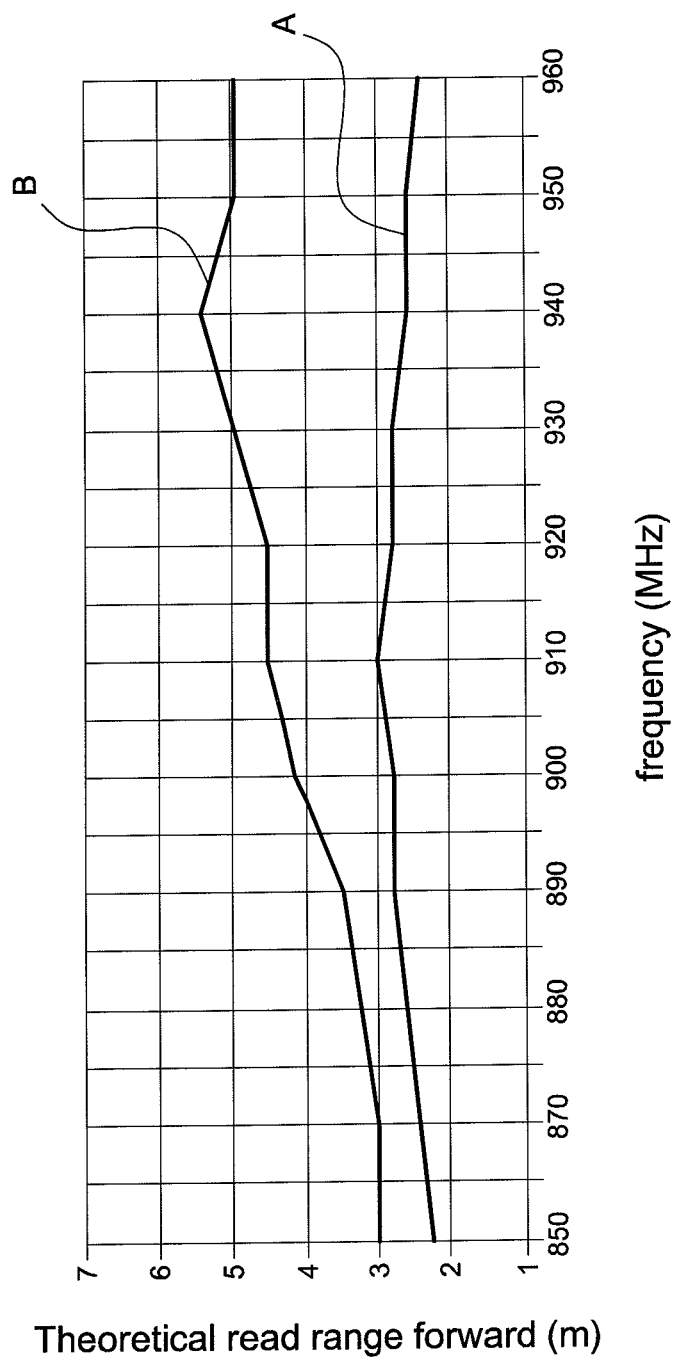
FIG. 7 is a graph that shows the reading scopes with curve A which represents the electronic tag without being attached to the metallic surface of the product and curve B which represents the electronic tag that is attached to the metallic surface of the product.

Please refer to FIGS. 5, 6 and 7. FIG. 5 schematically shows an electronic tag which is attached to an area that is not located on the metallic surface of the product according to the invention. FIG. 6 schematically shows an electronic tag which is attached to the metallic surface of the product according to the invention. FIG. 7 is a graph that shows the reading scopes with curve A which represents the electronic tag without being attached to the metallic surface of the product and curve B which represents the electronic tag that is attached to the metallic surface of the product. As shown in FIG. 7, curve A represents a reading scope within 2 meters of the electronic tag without being attached to the metallic surface 301 of the product 30.

As shown in FIG. 7, curve B represents a reading scope within 5 meters of the sixth metallic line segment 32, the seventh metallic line segment 33 and the eighth metallic line segment 34 of the electronic tag 10, which are opposite to the radiation body 2 and which have been, in view of the reference line 4, attached to the metallic surface 301 of the product 30.

Obviously, in view of the reference line 4, attaching the sixth metallic line segment 32, the seventh metallic line segment 33 and the eighth metallic line segment 34 of the grounding body 3 of the electronic tag 10, which are opposite to the radiation body 2, to the metallic surface 301 of the product 30 can enlarge the grounding area due to coupling the sixth metallic line segment 32, the seventh metallic line segment 33 and the eighth metallic line segment 34 with such metallic surface 301, and the signal reading distance of the electronic tag 10 can be broadened and extended thereby; moreover, the size of the electronic tag 10 can also be reduced thereby.

While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. An electronic tag capable of coupling to metal, the electronic tag being attached to a metallic surface of a product, the electronic tag comprising:
    a substrate;
    a radiation body arranged on a surface of the substrate;
    a grounding body arranged on the surface of the substrate having the radiation body thereon, the grounding body electrically connecting to the radiation body, the grounding body being of rectangular window frame shape; and
    a reference line arranged on the surface of the substrate having the grounding body thereon, the reference line arranged within the rectangular window frame formed by the grounding body,
    wherein the grounding body has a gap on a lateral side thereof and the lateral side is vertical to the reference line, a distance between the gap and the radiation body is smaller than a distance between the reference line and the radiation body;
    wherein while the electronic tag is attached to the metallic surface of a product, a portion of the grounding body, which is opposite to the radiation body, contacts with the metallic surface, so that the signal reading distance of the electronic tag can be broadened and extended in virtue of coupling the grounding body with the metallic surface to cause the grounding area to be enlarged.

2. The electronic tag capable of coupling to metal according to claim 1, wherein the substrate is selected from the group consisting of: a transparent or opaque sheet of polyimide (PI), polyvinyl chloride (PVC), polyethylene terephthalate (PET) or a composite of PI, PVC or PET sheet and a sticker.

3. The electronic tag capable of coupling to metal according to claim 1, wherein the radiation body has a first metallic line segment, a second metallic line segment connects to the first metallic line segment in a certain angle, a third metallic line segment connects to the second metallic line segment and a fourth metallic line segment connects to the third metallic line segment in a certain angle, wherein the third metallic line segment is parallel with the first metallic line segment.

4. The electronic tag capable of coupling to metal according to claim 3, wherein the first metallic line segment, the second metallic line segment and the third metallic line segment are formed into a U shape.

5. The electronic tag capable of coupling to metal according to claim 1, wherein the grounding body has a fifth metallic line segment which electrically connects to the fourth metallic line segment, a sixth metallic line segment connects to the fifth metallic line segment in a certain angle, a seventh metallic line segment connects to the sixth metallic line segment in a certain angle, an eighth metallic line segment connects to the seventh metallic line segment in a certain angle and a ninth metallic line segment connects to the juncture of the fifth metallic line segment and the fourth metallic line segment, wherein the seventh metallic line segment is opposite to the fifth metallic line segment, the eighth metallic line segment is opposite to the sixth metallic line segment, and the ninth metallic line segment is opposite to the sixth metallic line segment, and the gap is between the eighth metallic line segment and the ninth metallic line segment.

6. The electronic tag capable of coupling to metal according to claim 5, further comprises two metallic points which are arranged on the surface of the substrate and on the point that sits outside the grounding body and beside said gap.

7. The electronic tag capable of coupling to metal according to claim 6, further comprises a chip which is arranged on the gap between the eighth metallic line segment and the ninth metallic line segment, and electrically connected to the eighth metallic line segment, the ninth metallic line segment and the two metallic points.

8. The electronic tag capable of coupling to metal according to claim 5, wherein the fifth metallic line segment, the sixth metallic line segment, the seventh metallic line segment, the eighth metallic line segment and the ninth metallic line segment of the grounding body are formed into a rectangular window frame shape.

9. The electronic tag capable of coupling to metal according to claim 1, wherein the reference line is arranged on the surface of the substrate and within said frame formed by the fifth metallic line segment, the sixth metallic line segment, the seventh metallic line segment, the eighth metallic line segment and the ninth metallic line segment of the grounding body.

* * * * *